Aug. 29, 1967  J. P. CAPLAN  3,338,378
CONVEYOR CHAINS
Filed Feb. 5, 1965  2 Sheets-Sheet 1

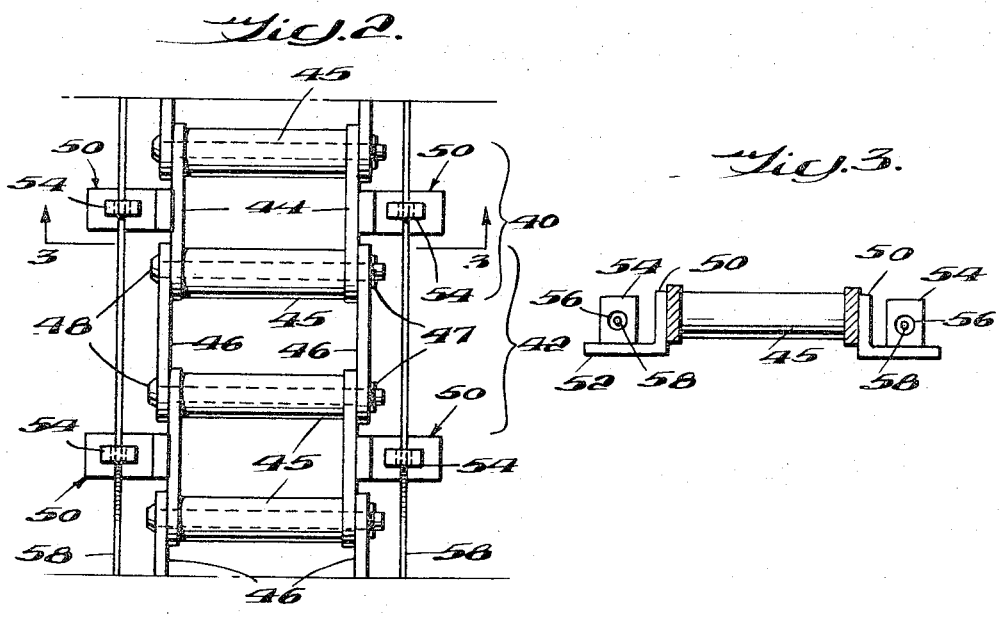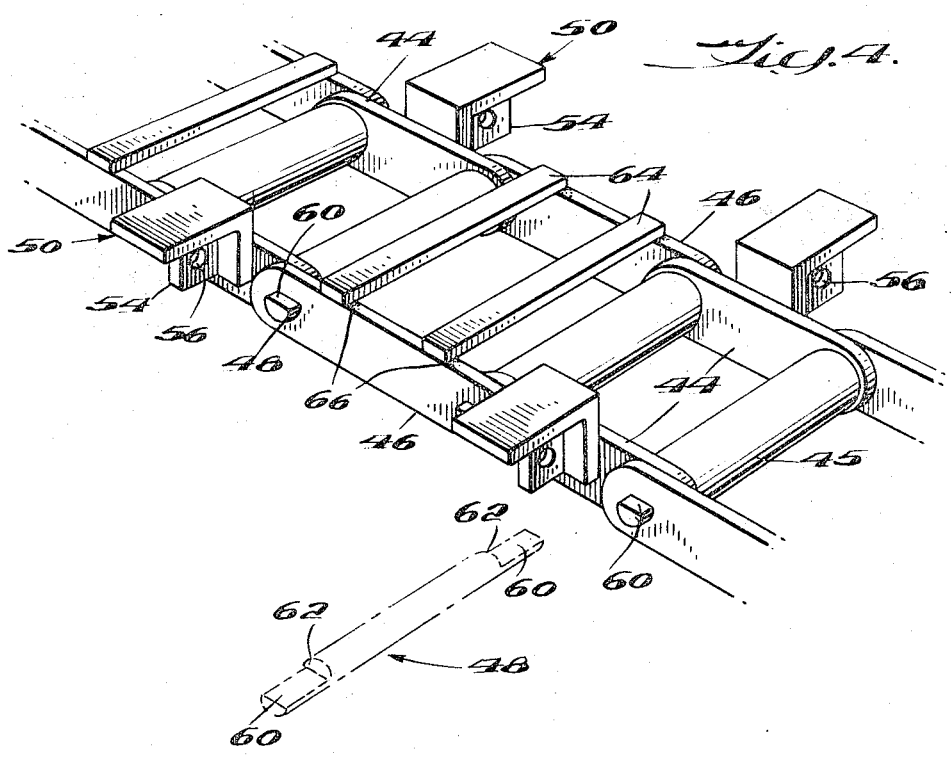

United States Patent Office
3,338,378
Patented Aug. 29, 1967

3,338,378
CONVEYOR CHAINS
Jacob P. Caplan, 2905 Taney Road,
Baltimore, Md. 21209
Filed Feb. 5, 1965, Ser. No. 430,570
11 Claims. (Cl. 198—140)

This invention relates to improvements in conveyor chains and more particularly, to chain structure which maintains its integrity even when one of the links of the chain in the structure is broken.

Often when one of the links of a conveyor chain breaks, the chain disengages from its driving mechanism necessitating not only repair of the broken link but return of the chain to the operative position. Depending on the use and size of the chain, this return can involve a considerably greater expense than the cost of the repair.

A typical situation in which cost, including that which results from machine down-time, is often particularly excessive is when breakage of a link of a roller chain of an inclined bucket conveyor occurs. Upon such breakage and the resultant disengaging of a pair of adjacent links of the chain, the chain falls away from the elevated drive mechanism to drop to the bottom of the conveyor housing. Repair of the roller chain then requires the fallen and entangled chain and buckets to be extricated from the conveyor housing for repair and subsequently returned thereto when the repair is completed. As the size of the bucket conveyor increases, the attendant increase in size of the conveying elements makes the job of extrication particularly difficult, time consuming, and costly, and in some cases, the chain becomes so twisted upon falling that its condition is beyond repair.

It is an object of the present invention to provide a way to prevent the collapse of drive or conveyor chains upon disengagement of the links thereof. Another object is to provide means for preventing such disengagement from occurring. A particular object of this invention is to maintain the conveying elements of an inclined, including vertical, bucket conveyor in at least nearly operative position when disengagement occurs between links of the conveyor chain. Other objects will appear hereinafter.

These and other objects will become apparent by reference to the following detailed description and accompanying drawings in which:

FIG. 2 is a plan view of an enlarged section of the conveyor chain, with the buckets removed, of the conveyor shown in FIG. 1;

FIG. 3 is a section taken along line 3—3 of FIG. 2; and

FIG. 4 is an isometric view of section of conveyor chain incorporating additional features of the present invention.

Figure 1:
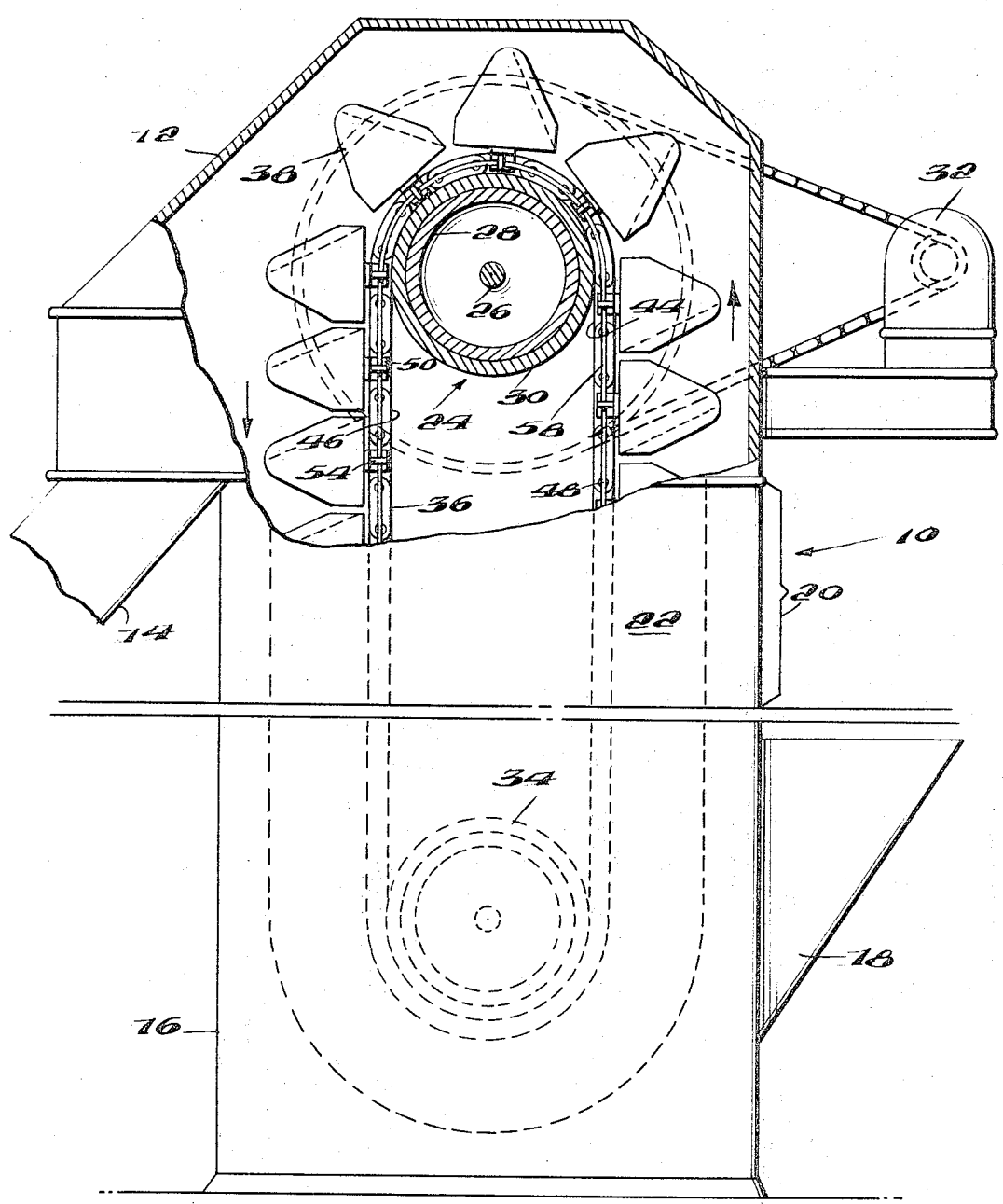
FIG. 1 is front view, partially in section, of a vertical bucket conveyor which incorporates features of the present invention.

In FIG. 1 is shown a bucket conveyor 10 of indeterminate height and consisting of a head section 12 having an outlet chute 14, a boot section 16 having an inlet chute 18, and several intermediate sections 20 (a portion of one such section is shown), each consisting of an open-ended housing 22 having a rectangular cross-section. A driving mechanism 24 is journalled in the head section 12 and consists of a driving shaft 26, a holding drum 28 mounted thereon, and a friction drum 30 removably mounted over the holding drum 28. Mounted adjacent the head section 12 is a motor 32 to chain drive the mechanism 24. A sprocket 34, shown in dashed lines, is journalled in the boot section 16 of the conveyor 10. Trained around the driving mechanism 24 and sprocket 34 is an endless roller chain 36 having conveying buckets 38 mounted along its length. Driving of this chain is obtained by its frictional engagement with the friction drum 30. The buckets 38 are of the type in which their underside are formed into a chute to receive the discharge from the next successive bucket 38 and direct it to the outlet chute 14.

In FIG. 2 is shown a portion of roller chain 36 consisting of roller links 40 and connecting links 42, the roller links 40 consisting of a pair of spaced sidebars 44 and a pair of bushings 45 extending transversely from one to the other, the connecting links 42 consisting of a pair of spaced sidebars 46 and a pair of headed connecting pins 48 extending through registering apertures in the sidebars 44 and 46 and in the bushings 45 to connect the roller and connecting links in end-to-end pivotal relation, thereby forming the series of links which constitute the roller chain. Cotter-pins 47 pass through the nonheaded ends of the connecting pins 48 to preserve this relation.

In operation, the friction drum 30 is rotated and the material to be elevated is added to the boot section 16 via chute 18 and is picked up by the buckets 38 moving in the direction indicated by the arrows to be discharged into the outlet chute 14. The foregoing description of the conveyor and its operation is of conventional structure and practice, with the present invention residing in the provision of means for maintaining the integrity of the chain 36 should one of its links disengage from an adjacent link.

In greater detail, short sections 50 of angle iron are mounted to the sidebars 44 of each roller link 40, as shown, with the flange portion 52 of each angle-iron section 50 extending outwardly from a point above the upper surface of their respective sidebars 44. Normally, these angle iron sections 50 are used solely to mount the conveying buckets 38 to the roller chain 36 via bolting through apertures (not shown) in the buckets 38 and flange portions 52. For convenience, in the present invention, the buckets 38 are welded to the outer face of the flange portions 52. Mounted to extend from the inner face of each flange portion 52 is a block 54 having an aperture 56 therethrough. Extending through the apertures 56 along the chain 36 and on each side thereof is a wire rope 58. In this manner, each rope 58 is secured in parallel to the chain 36.

As shown in FIG. 1, the rope 58 travels with the chain 36. To be made endless, as is the chain 36, the ends (not shown) of the rope are spliced together in conventional fashion.

The rope 58 is preferably of such length relative to the length of the chain 36 so as to be essentially free of load while all the links of the chain are in proper engagement. When a pair of adjacent links become disengaged resulting from the breaking of one of the elements of the chain, it is apparent that the rope 58 will remain integral to assume the load applied to the chain 36 by its own weight and by the weight of the material in the buckets 38. Consequently, whereas formerly the chain 36 would collapse into the lower portion of the bucket conveyor 10, the presence of rope 58, according to the present invention, retains the overall integrity of the composite structure of chain 36 and rope 58 to prevent this collapse. The fact that the rope 58 is essentially non-load bearing prior to disengagement of links of the chain insures that the rope 58 is sufficiently strong to assume the required burden. Since the composite chain structure of the present invention does not collapse, the broken link or element thereof can be repaired while the chain 36 is in place and nearly operative position, and then the separated links of the chain can be returned for end-to-end connection by the use of portable block and tackle. In contrast, if the chain had collapsed, a derrick would generally be required to lift the chain from the conveyor housing for repair and would again be required for returning the chain to the conveyor.

The parallel securement of chain links with an essentially load free element according to the present invention can be applied to other types of chains and in other types of inclined conveyors. The securement may obviously be made by other means and with greater or lesser frequency along the chain length to obtain similar results. An upper driving sprocket can be used instead of a friction drum 30, in which case the chain upon disengagement of adjacent links will collapse no further than the drive shaft, corresponding to shaft 26, due to the presence of the wire rope 58. It is also apparent that the bucket can be mounted to the angle iron sections 50 by the conventional bolting technique and the block 54 mounted off-center of the inner face of the flange portion 52 or elsewhere on the chain structure so long as the rope is clear of the driving and driven sprockets or the like.

In FIG. 4 is an additional embodiment consisting of means for preventing the connecting links 42 from disconnecting and more particularly for preventing the sidebars 46 from disengaging from the connecting pins. In this embodiment, each connecting pin 48 is modified by milling or otherwise forming flats 60 in each end, with the resultant shoulders 62 being spaced so as to abut the inner surface of the sidebars 46 positioned at each end of the modified connecting pin 48. Thus, the spacing between shoulders 62 for each pin is the length of the bushing 45 and the thickness of the two sidebars 44 of the roller link. The apertures in the sidebars 46 for accepting the modified connecting pins 48 are half-moon in shape to correspond to the ends of the pins.

To assemble the roller links and connecting links in this embodiment, the modified connecting pins 48 are first inserted into the bushings 45 and registering apertures of the sidebars 44 and then the sidebars 46 are positioned so that their half-moon apertures receive the semi-circular ends to the modified pins to form the assembly shown in FIG. 4. To retain the sidebars 46 in place independent of the roller links and modified connecting pins 48, a pair of connecting bars 64 are positioned across the upper edges of these sidebars by welds 66, with the connecting bars being inwardly spaced from the ends of the sidebars 46 sufficiently to permit the sidebars 44 to pivot on the modified connecting pins 48. The connecting bars 64 are sufficiently shallow to permit the buckets 38 to be mounted on the angle-iron sections 50 as previously explained.

In operation, should a modified connecting pin 48 break within the bushing 45, the engagement of the shoulders 62 with the inner surfaces of sidebars 46 and the stabilization of these sidebars via connecting bars 64 prevents the broken sections of the pin from working free from its respective bushing 45 and passing through the apertures of sidebar 46. It is apparent that the connecting pins 48 can be otherwise modified to obtain this result, such as by having the ends of the pins turned to a smaller diameter to form an annular shoulder instead of a half-moon shoulder or to have end portions of reduced size but in some other shape so long as the apertures in the sidebar 46 are of substantially similar shape. It is also apparent that the roller links and connecting links can be of different configuration than the links 40 and 42 shown. The parallel securement of a wire rope 58 to the roller chain is also useful with the chain constructed with the modified connecting pin 48 and connecting bar 64 arrangement should disengagement occur for some reason other than pin breakage.

As many widely different embodiments of this invention may be made without departing from the spirit and scope thereof, it is to be understood that this invention is not limited to the specific embodiments thereof except as defined in the appended claims.

What is claimed is:
1. In an inclined conveyor comprising upper journalled means, lower journalled means, and continuous conveyor means trained around each said journalled means, at least one essentially load-free continuous element trained around each said journalled means, bracket means secured at spaced intervals along said conveyor means, said bracket means each having an aperture therein, said free load continuous element threaded through said apertures, whereby upon breakage of said conveyor means, the training of said continuous element around said upper journalled means prevents collapse of said conveyor means therefrom.

2. In the inclined conveyor of claim 1 wherein said conveyor means includes a continuous chain.

3. In the inclined conveyor of claim 2 wherein said chain is a roller chain.

4. In the inclined conveyor of claim 3 wherein said continuous element is wire rope.

5. In the inclined conveyor of claim 2 wherein said chain consists of a series of links connected in end-to-end relation to form a continuous series thereof and said bracket means are positioned at every other link of said series of links.

6. In the inclined conveyor of claim 2 wherein said continuous element and bracket means are provided for each of the lateral sides of said chain.

7. In the inclined conveyor of claim 2 wherein said conveyor means includes a plurality of buckets mounted therealong.

8. In an inclined conveyor comprising upper journalled means, lower journalled means, and an endless roller chain consisting of a series of links connected end-to-end trained around each said journalled means, a plurality of block elements mounted extending at spaced locations along the length and from at least one lateral side of said chain, each said block elements having an aperture running in the direction of the length of said chain, essentially load-free endless rope means trained around each said journalled means and passing through each aperture of said block elements on said lateral side of said chain, to parallelly secure said rope means to said chain, with said rope means being capable of assuming the load applied to said chain upon disengagement of one of its links from an adjacent line thereof, whereby upon said disengagement, the training of said rope means around said upper journalled means prevents collapse of said chain therefrom.

9. In the inclined conveyor of claim 8 and additionally a housing for each said journalled means, said chain, and said rope means, and a plurality of buckets mounted along said chain to form a bucket conveyor.

10. In the inclined conveyor of claim 8 wherein said rope means is a wire rope.

11. In the inclined conveyor of claim 8 wherein said block elements are mounted extending from each of the lateral sides of said chain and said rope means are provided for each said lateral sides, passing through each aperture of said block elements on their corresponding lateral side.

References Cited

UNITED STATES PATENTS

| | | | |
|---|---|---|---|
| 826,066 | 7/1906 | Scovell | 198—190 |
| 1,105,288 | 7/1914 | Morse | 74—253 |
| 1,634,334 | 7/1927 | Morse | 74—253 |
| 1,737,823 | 12/1929 | Bodle | 198—189 |
| 2,319,979 | 5/1943 | Collins | 198—195 |
| 2,955,700 | 11/1960 | Badger | 198—189 |
| 3,149,715 | 8/1964 | Massimiani | 198—232 |

FOREIGN PATENTS

| | | |
|---|---|---|
| 274,176 | 5/1914 | Germany. |
| 515,886 | 1/1931 | Germany. |

EVON C. BLUNK, *Primary Examiner.*

RICHARD E. AEGERTER, *Examiner.*